United States Patent
Gauler

[11] Patent Number: 5,429,493
[45] Date of Patent: Jul. 4, 1995

[54] MANIFOLD CLAMPING MECHANISM

[75] Inventor: Kurt Gauler, Erzhausen, Germany

[73] Assignee: Incoe Corporation, Troy, Mich.

[21] Appl. No.: 321,171

[22] Filed: Oct. 11, 1994

Related U.S. Application Data

[63] Continuation of Ser. No. 6,376, Jan. 19, 1993, abandoned.

[30] Foreign Application Priority Data

Jan. 20, 1992 [DE] Germany .................. 42 01 341.0

[51] Int. Cl.⁶ .............................................. B29C 45/18
[52] U.S. Cl. ..................................... 425/567; 425/572
[58] Field of Search ............... 425/567, 572, 573, 589, 425/549

[56] References Cited

U.S. PATENT DOCUMENTS

| | | | |
|---|---|---|---|
| 4,563,149 | 1/1986 | Landis | 425/572 X |
| 4,740,151 | 4/1988 | Schmidt et al. | 425/572 X |
| 4,820,147 | 4/1989 | Gellert | 425/572 X |
| 5,007,821 | 4/1991 | Schmidt | 425/572 X |
| 5,022,846 | 6/1991 | Schmidt | 425/572 X |
| 5,049,062 | 9/1991 | Gellert | 425/572 X |
| 5,049,603 | 3/1992 | Gellert | 425/567 X |
| 5,096,410 | 3/1992 | Loulourgas | 425/567 X |
| 5,096,411 | 3/1992 | Gellert | 425/572 X |
| 5,112,214 | 5/1992 | Glatt, Jr. | 425/567 |
| 5,232,710 | 8/1993 | Miyazawa et al. | 425/573 X |
| 5,269,677 | 12/1993 | Gauler | 425/572 X |

FOREIGN PATENT DOCUMENTS

480213A1 4/1992 European Pat. Off. .
8709724.9 U 10/1987 Germany .

OTHER PUBLICATIONS

"Developments in runnerless moulding", Rowland F. Evans, European Plastics News, Jun. 1985, pp. 49–52.

Primary Examiner—Richard L. Chiesa
Attorney, Agent, or Firm—Brooks & Kushman

[57] ABSTRACT

A clamping mechanism for a hot-runner manifold (1) used for injection molding is provided. Screws (11) are used to hold the manifold (1) to a mold plate (7). The screws (11) are attached to clamping members (17) which, in turn, are connected to the manifold. The clamping members (17) include socket portions (21) which are positioned in circular recesses (13) in the manifold. The clamping members (17) can undergo limited pivotal movement due to thermal expansion of the manifold during use.

15 Claims, 2 Drawing Sheets

MANIFOLD CLAMPING MECHANISM

This is a continuation of application Ser. No. 08/006,376 filed on Jan. 19, 1993, and now abandoned.

TECHNICAL FIELD

The present invention relates to clamping mechanisms for hot-runner manifold systems used in injection molding processes to convey hot liquid plastic materials into sprue bushings and, in turn, into product mold cavities. The invention provides improved securing of the manifold to the mold and at the same time allows for limited thermal expansion and movement of the manifold during use.

BACKGROUND ART

The invention concerns a unique and advantageous clamping mechanism for a hot-runner manifold system used for injection molding. A fastener connection is provided between the hot-runner manifold block and the mold plate of the product mold for the injection-molding system. A sprue bushing is situated in the mold plate in tight fluid communication with the hot-runner manifold. Clamping members located on both sides of the hot-runner manifold are screwed into the mold plate and secure the manifold to the mold plate.

Hot-runner manifold systems are well known and are used to convey the synthetic-material melt, plastified by heating, into a plurality of individual sprue bushings positioned in mold plates of the injection-molding system. The manifolds keep the plastic material in a fluid condition while the material flows from the injection machine nozzle through the sprue bushings and into the mold cavity. Hot-runner manifold systems provide for use of a plurality of sprue bushings and multi-cavity molds and thus allow increased manufacture of more products.

The sprue bushings are inserted into recesses or bores in the mold plate. The top or inlet ends of the sprue bushings are positioned and sealed against the lower surface of the hot-runner manifold block. (The lower surface is also called the "underside" of the manifold block. In addition, the "top side" of the hot-runner manifold means the external side of the hot-runner manifold block, which lies opposite the lower surface and the sprue bushings.)

Known hot-runner manifolds commonly contain pairs of lugs which protrude on opposite sides of the block and which accommodate clamping screws. In order to produce such hot-runner manifold blocks, the external contours, including the externally protruding lugs, are machined from a larger block of metal material. This requires considerable expenditure of labor and waste of material.

Since the hot-runner manifolds are heated, they undergo thermal expansion when in operation, while the sprue bushings inserted into the injection-molding mold plate typically maintain their position. Such thermal expansion, depending on the dimensions of the hot-runner manifold block, may be relatively large, for example on the order of 3 mm. This causes twisting and distortion of the clamping screws inserted in the lateral lugs. Furthermore, the thermal expansion causes an increase in the surface pressure between the hot-runner manifold and the sprue bushings. This may cause the bushing to be forced into the bottom surface (under side) of the hot-runner manifold and cause surface damage (erosion) on the sealing surface.

Consequently, it is an object of the present invention to provide a clamping mechanism for hot-runner manifold systems which is an improvement over known fastening mechanisms. It is another object of the present invention to provide a clamping mechanism for hot-runner manifold systems which permits thermal expansion of the manifolds without adverse effects on the clamping screws and/or the sprue bushings.

SUMMARY OF THE INVENTION

According to the invention, the above and other objects are achieved by providing clamping members in recesses on the manifold block which allow limited horizontal movement of the manifold relative to the clamping screws and mold plate. Open recesses or pockets are provided on the top of the manifold block along opposite longitudinal edges of the manifold. The recesses are defined by a bottom surface parallel to the plane of the mold plate and by a perpendicular cylinder-wall surface forming the pocket. A clamping member with a cylinder shoulder is positioned in the recess and used to secure the manifold to the mold.

The clamping members are fastened to the sides of the hot-runner manifold and are capable of limited movement in the lengthwise direction of the manifold. The portions of the clamping members which protrude from the sides of the hot-runner manifold form lugs for accommodating clamping screws which are screwed into the mold plate.

When the hot-runner manifold block undergoes thermal expansion during use, the cylinder shoulder of the clamping member, which is accommodated in the lateral recess of the hot-runner manifold, pivots in the recess (around the clamping screw). The attached lugs and the clamping screws remain substantially stationary. As a result, no bending forces are exerted upon the clamping screws and no reactive forces act on the hot-runner manifold block which are capable of bending and/or distorting it.

For the same reason, thermal expansion of the hot-runner manifold block does not increase the surface pressure between the manifold and the sprue bushings. The risk of damaging the sealing surfaces between the sprue bushings and the hot-runner manifold block is significantly diminished because when the hot-runner manifold expands, it moves in a straight line (along its longitudinal dimension), parallel to the direction of the sealing surfaces.

With the present invention, the manufacture of the hot-runner manifold block is simplified and less expensive. The external surfaces of the manifold block have flat external surfaces into which the recesses for the clamping bodies are machined. This greatly lowers material requirements and labor expenditure for the production of the hot-runner manifold., The clamping members are economically produced separately and are dimensioned to fit into the recesses formed along the edges of the hot-runner manifold.

Further objects, benefits and features of the invention are apparent and disclosed when the above is considered in view of the attached drawings and following description and claims.

BRIEF DESCRIPTION OF THE PREFERRED EMBODIMENT

Figure 1:
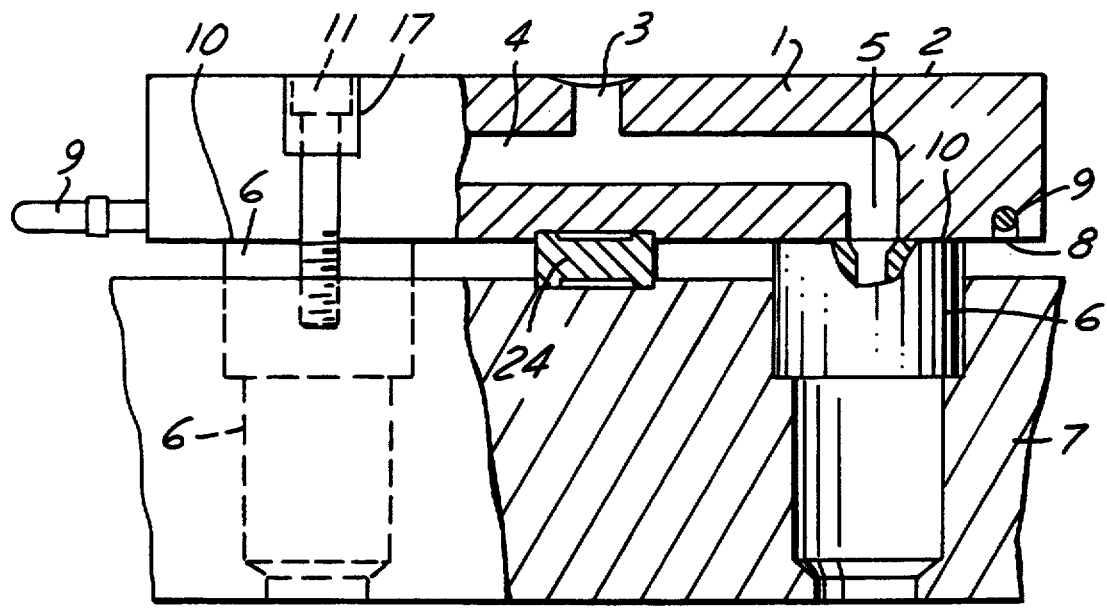
FIG. 1 is a partial cross-section through a hot-runner manifold system, showing two sprue bushings in a mold plate of an injection-molding system.

The hot-runner manifold block shown in the drawings is essentially shaped like a parallelepiped and oblong. It is referred to generally by the reference numeral 1. The top side 2 of the manifold block 1 has an inlet channel 3 to which is connected a nozzle (not shown) of the injection molding machine, designed to supply the molten synthetic material to be molded.

A distributing channel 4 extends along the manifold block 1 and leads to two outlet channels 5, to each of which is connected a sprue bushing 6. The two sprue bushings are positioned in a mold plate 7 of the cavity mold used in the injection-molding system to produce a molded part. The sprue bushings 6 allow the liquid plastic material to flow into mold cavities (not shown).

A heating member 9, curved in a U-shape as shown provides heat to the hot-runner manifold block 1 and retains the plastic material in the channels 4 and 5 in a molten state. The heating member 9 is inserted in a groove on the underside 8 of the manifold block. The flat underside surface 8 of hot-runner manifold 1 and the upper surface (inlet ends) 10 of sprue bushings 6 which face the underside surface 8, form sealing surfaces which may shift relative to one another because of the thermal expansion of the hot-runner manifold block 1, when the injection molding system is in use.

One or more spacers 24 are positioned between the manifold block 1 and mold plate 7 in order to accommodate and distribute some of the pressure load between the manifold block 1 and the sprue bushings 6 when the block is clamped tightly to the mold plate 7.

Figure 3:
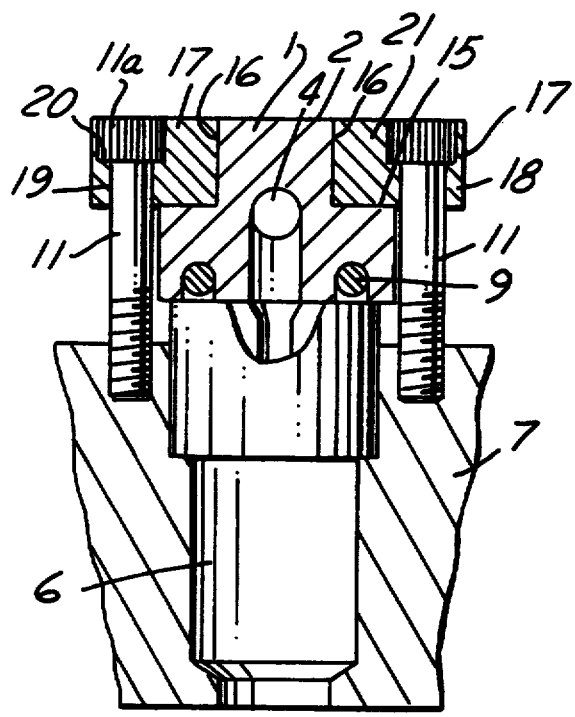
FIG. 3 is a cross-sectional view of the system depicted in FIG. 2 taken along the line 3—3 of FIG. 2.

The manifold block 1 is fastened to mold plate 7 by conventional clamping screws 11. On both sides of each sprue bushing 6 (or on both sides of the respective channels 5), recesses 13 are provided on the two longitudinal edges 12 of hot-runner manifold 1 which lie opposite to each other. The recesses 13 are open toward top side 2 and toward the respective adjacent side-surfaces 14 of the manifold block. The recesses 13 are each defined by bottom surfaces 15 (FIG. 3) that are parallel to the plane of mold plate 7, and by cylinder-wall surfaces 16 that are perpendicular thereto. The longitudinal axes of the cylinder-wall surfaces 16 are parallel to and separated at a distance from the axes of their respective clamping screws 11. The axes also are perpendicular to the plane of the mold plate 7.

A clamping member 17 is inserted into each of the recesses 13. The clamping members 17 each have two portions, a cylindrical socket or shoulder portion 21 and an outwardly protruding lug portion 18. The lug portion 18 has a bore 19 for the body of the clamping screw 11 and a counterbore 20 for the head 11a of the clamping screw 11. The socket or shoulder 21 is adapted to fit into recess 13. With this structure, the clamping body 17 is capable of limited horizontal pivoting movement in the lengthwise direction of the hot-runner manifold block.

In the case of the illustrated embodiment, the head 11a of clamping screw 11 is countersunk completely in clamping member 17. The lug portion 18 of clamping body 17 is a cylinder section of the same height as the cylinder shoulder or socket 21. Also, the height of the cylinder shoulder 21 of the clamping member 17 is approximately the same as the depth of the recess 13. With this preferred embodiment, neither clamping member 17 nor head 19 of the clamping screw 11 protrude beyond the top side 2 of the hot-runner manifold block 1, and the clamping member 17 has a uniform height.

Figure 2:
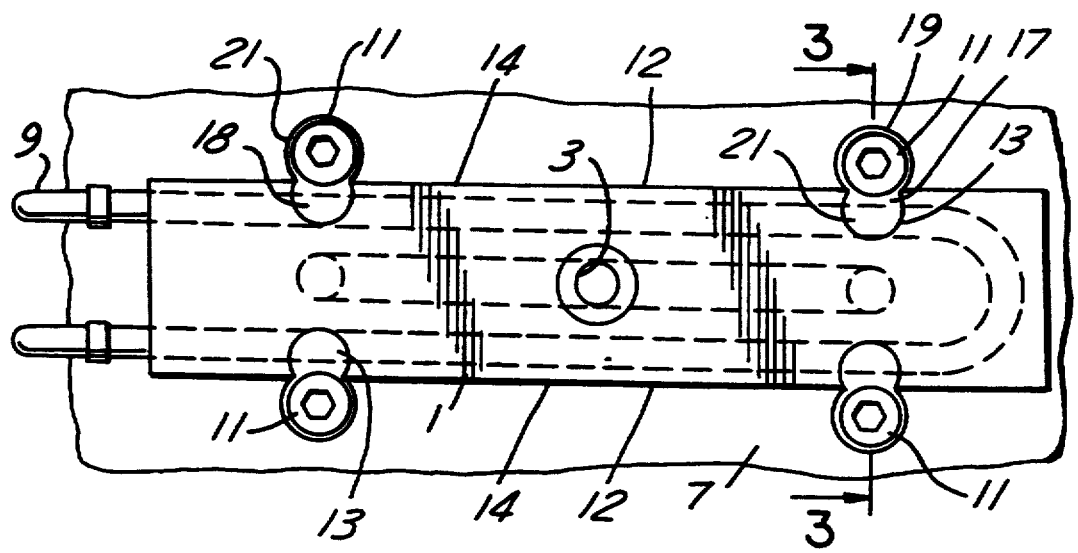
FIG. 2 is a top view of the hot-runner manifold system in accordance with FIG. 1.
Figure 4:
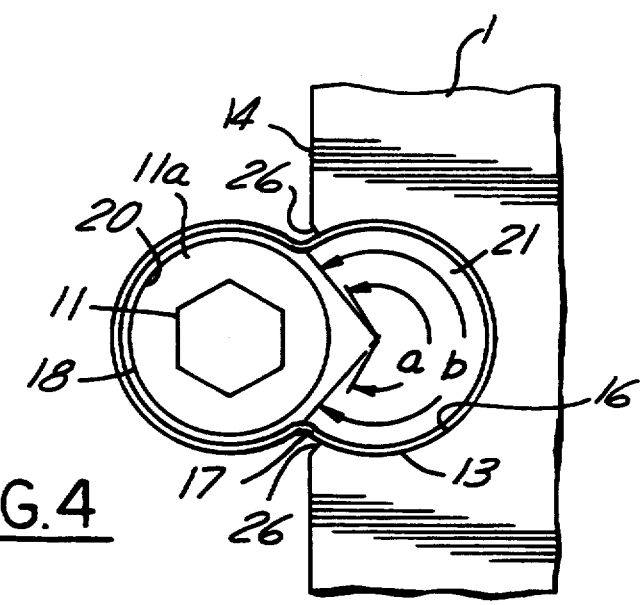
FIG. 4 is an enlarged top view of a clamping member for the hot-runner manifold block in accordance with the present invention.
Figure 5:
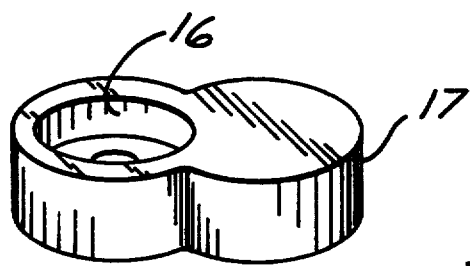
FIG. 5 is a perspective view of a clamping member.

As shown in FIGS. 2 and 4, the recesses 13 are precisely positioned in the sides of the manifold block 1 so that they are open and allow placement of the clamping members 17 and outward protrusion of the lug portions 18. The cylinder-perimeter angle a of the recess 13 is greater than 180° and preferably between 220° and 300° (see FIG. 4). In this manner, the cylinder shoulder or socket 21 of clamping body 17 is held in recess 13 and cannot be dislodged or removed laterally. Chamfers 26 are provided on the edges of the socket.

The cylinder-perimeter angle b (FIG. 4) of the cylinder shoulder or socket 21 is greater, preferably by about 10°, than the cylinder-perimeter angle a of cylinder-wall surface 16 of recess 13. This allows limited horizontal pivoting of clamping member 17 relative to hot-runner manifold block 1. When hot-runner manifold 1 undergoes thermal expansion because of changes in temperature, clamping member 17 is pivoted around clamping screw 11, without bending the screw.

The foregoing discussion discloses and describes exemplary embodiments of the present invention. One skilled in the art will readily recognize from such discussion, and from the accompanying drawings and claims, that various changes, modification and variations may be made therein without departing from the spirit and scope of the invention as defined in the following claims.

What is claimed is:

1. A clamping system for hot-runner manifolds for injection molding systems, the clamping system comprising:

a mold plate;

at least one sprue bushing positioned in said mold plate;

a manifold member positioned on said at least one sprue bushing and having at least one recess;

said recess having a bottom surface which is parallel to the bottom of the manifold member and a cylindrical wall surface; which is substantially perpendicular to the bottom surface of the manifold member;

clamping means for securely holding said manifold member in position;

said clamping means comprising at least one clamping member and at least one fastener device;

said clamping member having a socket portion which mates with said recess on said manifold member and has limited rotational movement to allow limited movement of said manifold member due to thermal expansion; and said clamping member having a lug portion connected to said socket portion, 2. The clamping system as set forth in claim 1 wherein said at least one fastener device is positioned in a channel in said lug portion, 3. The clamping system as set forth in claim 1 wherein said cylindrical wall surface has a cylinder-perimeter angle greater than 180°.

4. The clamping system as set forth in claim 3 wherein said angle is between 220° and 300°.

5. The clamping system as set forth in claim 1 wherein said socket portion has a cylinder-perimeter angle which is greater than the cylinder-perimeter angle of said recess.

6. The clamping system as set forth in claim 1 wherein said clamping member does not protrude above the upper surface of said manifold member.

7. The clamping system as set forth in claim 1 wherein said manifold member has at least two recesses and clamping means are provided for each of said recesses.

8. A system for retaining a hot-runner manifold on an injection mold bushing, comprising:
   a mold plate;
   an injection mold bushing positioned in said mold plate;
   a heated manifold positioned on said bushing for supplying hot melt into said bushing; and
   at least two socket means in said manifold;
   at least two clamping members for attaching said manifold to said mold plate, said clamping members each having a first portion pivotably positioned in one of said socket means in said manifold and a second portion fixedly secured to said mold plate;
   whereby thermal expansion of said manifold is allowed by pivotal movement of said clamping members.

9. The system of claim 8 wherein said second portions are secured to said mold plate by threaded fasteners.

10. A manifold clamping system comprising a manifold, a mold plate, at least one sprue bushing, and a plurality of clamping members, said bushing being positioned in said mold plate, said manifold being positioned on but not affixed to said bushing, said manifold having a plurality of sockets, each of said clamping members having a first portion rotatably positioned in one of said sockets and a second portion secured to a said mold plate with fasteners, whereby when said manifold is subjected to lateral thermal expansion, said first portions of said clamping members rotate in said sockets relative to said manifold and said second portions pivot around said fasteners.

11. A clamping system for hot-runner manifolds for injection molding systems, the clamping system comprising:
   a mold plate;
   at least one sprue bushing positioned in said mold plate;
   a manifold member positioned on said at least one sprue bushing and having at least one recessed socket;
   a clamping member for securely holding said manifold member to said sprue bushing and said mold plate, said clamping member having a socket portion positioned in said recessed socket and a lug portion positioned adjacent to said manifold member;
   fastener means securing said lug portion to said mold plate adjacent said manifold member;
   wherein upon lateral movement of said manifold member, said socket portion of said clamping member rotates within said recessed socket, and said lug portion pivots around said fastener means.

12. The clamping system as set forth in claim 11 wherein said recessed socket has a bottom surface which is parallel to the bottom of the manifold member and a cylindrical wall surface which is substantially perpendicular to the bottom surface of the manifold member.

13. The clamping system as set forth in claim 12 wherein said cylindrical wall surface has a cylinder-perimeter angle greater than 180°.

14. The clamping system as set forth in claim 12 wherein said socket portion has a cylinder-perimeter angle which is greater than the cylinder-perimeter angle of said recessed socket.

15. The clamping system as set forth in claim 10 wherein said manifold member has at least two recessed sockets, and clamping members are provided for each of said recessed sockets.

* * * * *

UNITED STATES PATENT AND TRADEMARK OFFICE
CERTIFICATE OF CORRECTION

PATENT NO. : 5,429,493
DATED : July 4, 1995
INVENTOR(S) : Kurt Gauler

It is certified that error appears in the above-indentified patent and that said Letters Patent is hereby corrected as shown below:

Column 2, line 57, after "manifold." dlete the ",".

Column 4, line 55, after "surface" delete ",".

Column 4, line 68, after "portion" delete "," and insert a --.--.

Column 5, line 3, after "portion" delete "," and insert a --.--.

Column 6, line 1, after "to" delete "a".

UNITED STATES PATENT AND TRADEMARK OFFICE
CERTIFICATE OF CORRECTION

PATENT NO. : 5,429,493
DATED     : July 4, 1995
INVENTOR(S) : Kurt Gauler

It is certified that error appears in the above-indentified patent and that said Letters Patent is hereby corrected as shown below:

Column 6, Line 41, after "claim" delete "10" and insert --11--.

Signed and Sealed this

Fourteenth Day of November, 1995

*Attest:*

BRUCE LEHMAN

*Attesting Officer*  *Commissioner of Patents and Trademarks*